US011541690B2

(12) United States Patent
Yamaguchi et al.

(10) Patent No.: US 11,541,690 B2
(45) Date of Patent: Jan. 3, 2023

(54) RUN-FLAT TIRE

(71) Applicant: BRIDGESTONE CORPORATION, Tokyo (JP)

(72) Inventors: Masashi Yamaguchi, Tokyo (JP); Keita Yumii, Tokyo (JP)

(73) Assignee: BRIDGESTONE CORPORATION, Tokyo (JP)

( * ) Notice: Subject to any disclaimer, the term of this patent is extended or adjusted under 35 U.S.C. 154(b) by 258 days.

(21) Appl. No.: 17/255,421

(22) PCT Filed: Jun. 17, 2019

(86) PCT No.: PCT/JP2019/023951
§ 371 (c)(1),
(2) Date: Dec. 22, 2020

(87) PCT Pub. No.: WO2020/004112
PCT Pub. Date: Jan. 2, 2020

(65) Prior Publication Data
US 2021/0252913 A1   Aug. 19, 2021

(30) Foreign Application Priority Data

Jun. 25, 2018   (JP) .............................. JP2018-120306

(51) Int. Cl.
*B60C 17/00* (2006.01)
*B60C 3/04* (2006.01)
*B60C 5/14* (2006.01)

(52) U.S. Cl.
CPC ................. *B60C 3/04* (2013.01); *B60C 5/14* (2013.01); *B60C 17/0009* (2013.01)

(58) Field of Classification Search
CPC ............ B60C 17/0009; B60C 17/0018; B60C 17/0027; B60C 17/0036; B60C 17/0045
See application file for complete search history.

(56) References Cited

U.S. PATENT DOCUMENTS

| | | | |
|---|---|---|---|
| 4,387,758 A | 6/1983 | Matsuda et al. | |
| 6,237,661 B1 | 5/2001 | Asano | |

(Continued)

FOREIGN PATENT DOCUMENTS

| | | | |
|---|---|---|---|
| CN | 102395474 A | 3/2012 | |
| CN | 103826876 A | 5/2014 | |

(Continued)

OTHER PUBLICATIONS

Wang Youshan et al., "Radical Tire Profile Design Theory and Structural Optimization", Information Compilation of The Chemical Industry and Engineering Society of China, p. 8-41, May 1, 2018.

(Continued)

*Primary Examiner* — Justin R Fischer
(74) *Attorney, Agent, or Firm* — Solaris Intellectual Property Group, PLLC

(57) ABSTRACT

At a run-flat tire, given that an average radius of curvature of a case line between an intersection point (0.1SHp) and an intersection point (0.2SHp) when viewed in a cross-section along a tire rotation axis is radius R1, and that an average radius of curvature of the case line between an intersection point (0.4SHp) and an intersection point (0.6SHp) when viewed in the cross-section along the tire rotation axis is radius R2, ratio R2/R1 is set to be greater than 0.3.

4 Claims, 2 Drawing Sheets

(56) References Cited

U.S. PATENT DOCUMENTS

| | | |
|---|---|---|
| 2012/0018071 A1 | 1/2012 | Takahashi et al. |
| 2012/0132338 A1 | 5/2012 | Horiuchi |
| 2013/0199688 A1 | 8/2013 | Nakazaki |
| 2014/0034205 A1 | 2/2014 | Yukawa |
| 2014/0048193 A1 | 2/2014 | Yukawa |
| 2014/0224401 A1 | 8/2014 | Tanaka |
| 2016/0016442 A1 | 1/2016 | Mori |
| 2018/0257439 A1 | 9/2018 | Kouda |

FOREIGN PATENT DOCUMENTS

| | | |
|---|---|---|
| CN | 105270103 A | 1/2016 |
| EP | 0397380 A1 | 11/1990 |
| EP | 1568512 A1 | 8/2005 |
| FR | 2809054 A1 | 11/2001 |
| GB | 2224703 A | 5/1990 |
| JP | S63-199102 A | 8/1988 |
| JP | H6-316206 A | 11/1994 |
| JP | H11-268507 A | 10/1999 |
| JP | 2002-301914 A | 10/2002 |
| JP | 2004-182164 A | 7/2004 |
| JP | 2006-35900 A | 2/2006 |
| JP | 2009-18771 A | 1/2009 |
| JP | 2009-234374 A | 10/2009 |
| JP | 2011-116319 A | 6/2011 |
| JP | 2012-116212 A | 6/2012 |
| JP | 2013-177115 A | 9/2013 |
| JP | 2014-31147 A | 2/2014 |
| JP | 2014-37214 A | 2/2014 |
| WO | 2017/043205 A1 | 3/2017 |

OTHER PUBLICATIONS

Li, Peiqing et al., "Geometric design safety estimation based on based on tire-road side friction", Transportation Research Part C—Emerging Technologies, p. 114-125, Feb. 29, 2016.

Search Report of the Chinese office action dated Mar. 15, 2022, from the SIPO in a Chinese patent application No. 2019800426880 corresponding to the instant patent application.

International Search Report issued in International Application No. PCT/JP2019/023951 dated Aug. 27, 2019.

RUN-FLAT TIRE

TECHNICAL FIELD

The present disclosure relates to a run-flat tire.

BACKGROUND ART

As a run-flat tire that makes it possible for a vehicle to travel over a fixed distance even in a state in which the internal pressure of the tire has fallen, there is a side-reinforced-type run-flat tire in which the tire side portions are reinforced by side reinforcing rubbers (see, for example, Japanese Patent Application Laid-Open (JP-A) No. 2012-116212).

SUMMARY OF INVENTION

Technical Problem

By the way, at a tire, it is desirable to lower the rolling resistance that relates to the fuel efficiency of the vehicle, and lowering of the rolling resistance is desirable in a run-flat tire as well.

Further, in a side-reinforced-type run-flat tire, because the vertical spring constant is high as compared with that of a general tire, it is also desirable to improve the riding comfort at the time of usual traveling. However, if the side reinforcing rubbers are made to be more pliant in order to improve the riding comfort at the time of usual traveling, there is the problem that the durability at the time of run-flat traveling suffers.

In view of the above-described circumstances, an object of the present disclosure is to provide a run-flat tire whose rolling resistance is decreased and that can achieve both riding comfort and run-flat resistance.

Solution to Problem

A run-flat tire relating to the present disclosure comprises: a pair of bead cores; a carcass that has a main body portion that spans between the pair of bead cores, and folded-over portions that are folded-over around the bead cores; a belt that is provided at a tire radial direction outer side of the carcass; side reinforcing layers that are provided at a tire width direction inner side of the carcass, and whose thicknesses gradually decrease toward tire radial direction both sides; and an inner liner that is provided at a tire inner surface side of the carcass, which is positioned at a tire radial direction outer side, and at a position further toward a tire width direction inner side than an imaginary line passing through a tire width direction outermost end of the belt and extending orthogonally to a tire inner surface, wherein, given that: a central line of the carcass is a case line; a height dimension of the case line measured in a tire radial direction from a reference line, which passes through a tire radial direction outer side end of the bead core and is parallel to a tire rotation axis, when viewed in a cross-section along the tire rotation axis in a state in which the run-flat tire is mounted to a standard rim and is at zero internal pressure, is side height SH; an intersection point of the case line and an imaginary line, which passes through a position that is apart from the reference line toward the tire radial direction outer side by 10% of the side height SH and which is parallel along the tire rotation axis, is 0.1SHp; an intersection point of the case line and an imaginary line, which passes through a position that is apart from the reference line toward the tire radial direction outer side by 20% of the side height SH and which is parallel along the tire rotation axis, is 0.2SHp; an intersection point of the case line and an imaginary line, which passes through a position that is apart from the reference line toward the tire radial direction outer side by 40% of the side height SH and which is parallel along the tire rotation axis, is 0.4SHp; an intersection point of the case line and an imaginary line, which passes through a position that is apart from the reference line toward the tire radial direction outer side by 60% of the side height SH and which is parallel along the tire rotation axis, is 0.6SHp; an average radius of curvature of the case line between the intersection points 0.1SHp and 0.2SHp when viewed in the cross-section along the tire rotation axis is radius R1; and an average radius of curvature of the case line between the intersection points 0.4SHp and 0.6SHp when viewed in the cross-section along the tire rotation axis is radius R2, ratio R2/R1 is set to be greater than 0.3.

A rubber that is more difficult for gas to permeate therethrough, e.g., mainly butyl rubber, than the other rubbers that structure the tire is generally used at the inner liner of a tire, and the loss (tan δ) of butyl rubber is greater than that of the other rubbers that structure the tire. At a tire, if a rubber whose loss is high is used at portions that deform greatly at the time of traveling, the rolling resistance deteriorates. Further, when comparing the tread portion and the side portions at a tire, the side portions deform more greatly than the tread portion at which the belt and the like are embedded.

In the run-flat tire relating to the present disclosure, the inner liner is provided at the tire inner surface side of the carcass, which is positioned at the tire radial direction outer side, and at a position further toward the tire width direction inner side than an imaginary line passing through the tire width direction outermost end of the belt and extending orthogonally to the tire inner surface. In other words, because the inner liner is not provided at the side portions that deform more greatly than the tread portion, the rolling resistance can be reduced as compared with a tire in which an inner liner is provided at the entire tire inner surface.

Note that the side reinforcing layer, which is thick and can support load at the time of run-flat traveling, is provided at the tire width direction inner side of the carcass. Therefore, even if the inner liner is not provided at the tire width direction inner side of the carcass, permeating of gas to the tire width direction outer side can be suppressed. In other words, at the tire width direction inner side of the carcass, the side reinforcing rubber replaces the inner liner.

Moreover, at the run-flat tire relating to the present disclosure, given that the average radius of curvature of the case line between the intersection points 0.1SHp and 0.2SHp is radius R1, and that the average radius of curvature of the case line between the intersection points 0.4SHp and 0.6SHp when viewed in a cross section along the tire rotation axis is radius R2, the ratio R2/R1 is set to be greater than 0.3. Therefore, the vertical spring constant at the time of usual traveling can be lowered, and excessive collapsing-in of the bead portions and the tire side portions at the time of run-flat traveling can be suppressed, and both riding comfort and run-flat durability can be achieved.

Advantageous Effects of Invention

In accordance with the run-flat tire of the present disclosure, the rolling resistance is decreased, and both riding comfort and run-flat resistance can be achieved.

Figure 1:
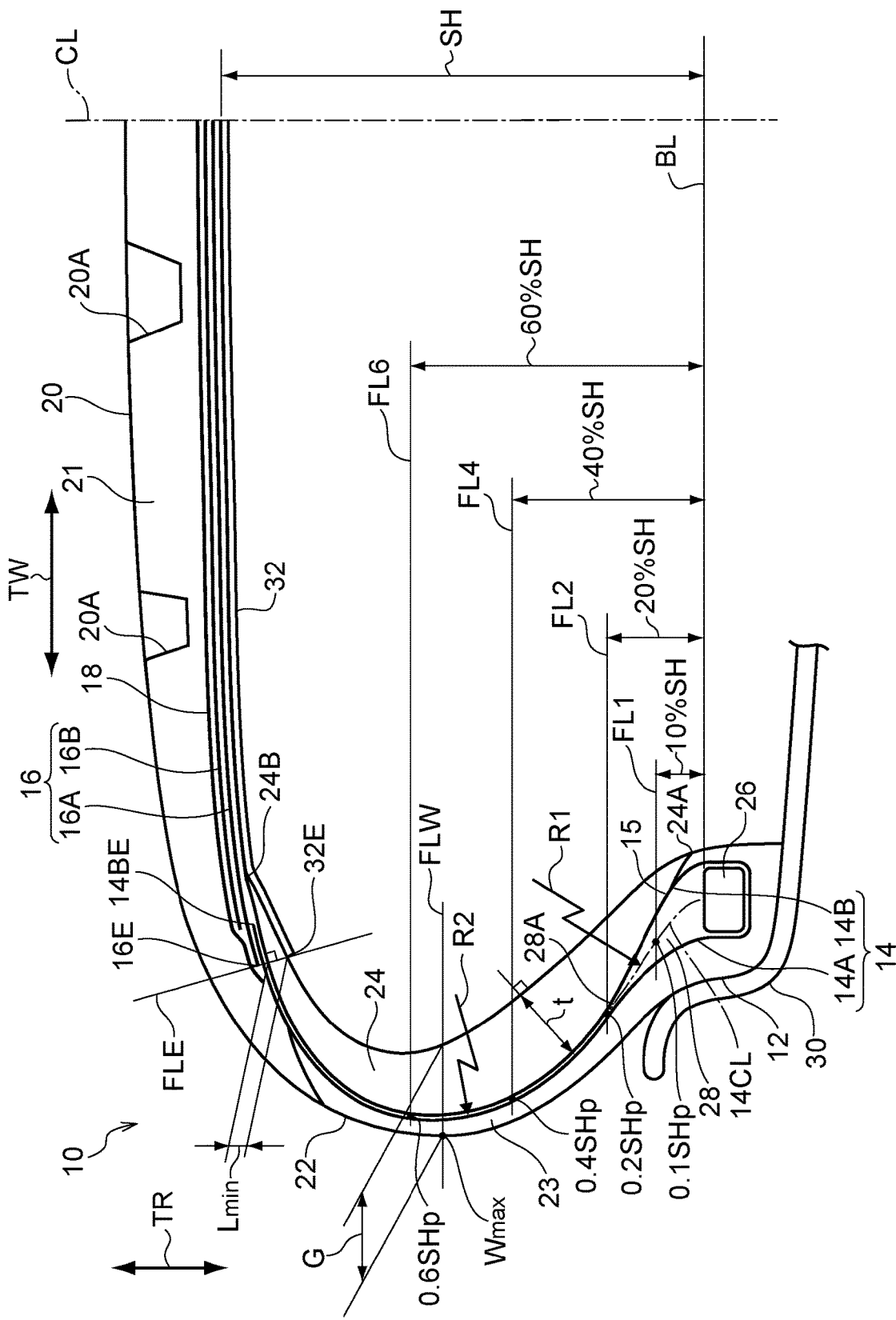
FIG. 1 is a half sectional view showing a half side of a cross-section in which a run-flat tire relating to an embodiment of the present invention is cut along a tire axial direction.

DESCRIPTION OF EMBODIMENTS (Structure of Run-Flat Tire)

A run-flat tire 10 relating to an embodiment of the present invention is described hereinafter with reference to the drawings. Note that, in the present embodiment, description is given of the run-flat tire 10 that is for a passenger vehicle.

Here, arrow TW in the drawings indicates the width direction of the run-flat tire 10 (the tire width direction), and arrow TR indicates the radial direction of the run-flat tire 10 (the tire radial direction).

What is called the tire width direction here means the direction parallel to the rotation axis of the run-flat tire 10, and is also called the tire axial direction. Further, the tire radial direction means the direction orthogonal to the rotation axis of the run-flat tire 10.

Further, reference letters CL indicate the equatorial plane of the run-flat tire 10 (the tire equatorial plane). Moreover, in the present embodiment, the rotation axis side of the run-flat tire 10 along the tire radial direction is called the "tire radial direction inner side", and the sides opposite the rotation axis of the run-flat tire 10 along the tire radial direction are called the "tire radial direction outer sides".

On the other hand, the equatorial plane CL side of the run-flat tire 10 along the tire width direction is called the "tire width direction inner side", and the side opposite the equatorial plane CL of the run-flat tire 10 along the tire width direction is called the "tire width direction outer side".

Further, in the following description, the rim is a standard rim (or "approved rim", "recommended rim") for the applied size as stated in the following standards. The standards are determined in accordance with industry standards that are valid in the geographical region in which the tire is manufactured or used. For example, the standards are prescribed by the "Year Book of The Tire and Rim Association Inc." in the U.S., by the "Standards Manual of The European Tire and Rim Technical Organization" in Europe, and by the "JATMA Year Book" of the Japan Automobile Tyre Manufacturer Association, Inc. in Japan.

Figure 2:
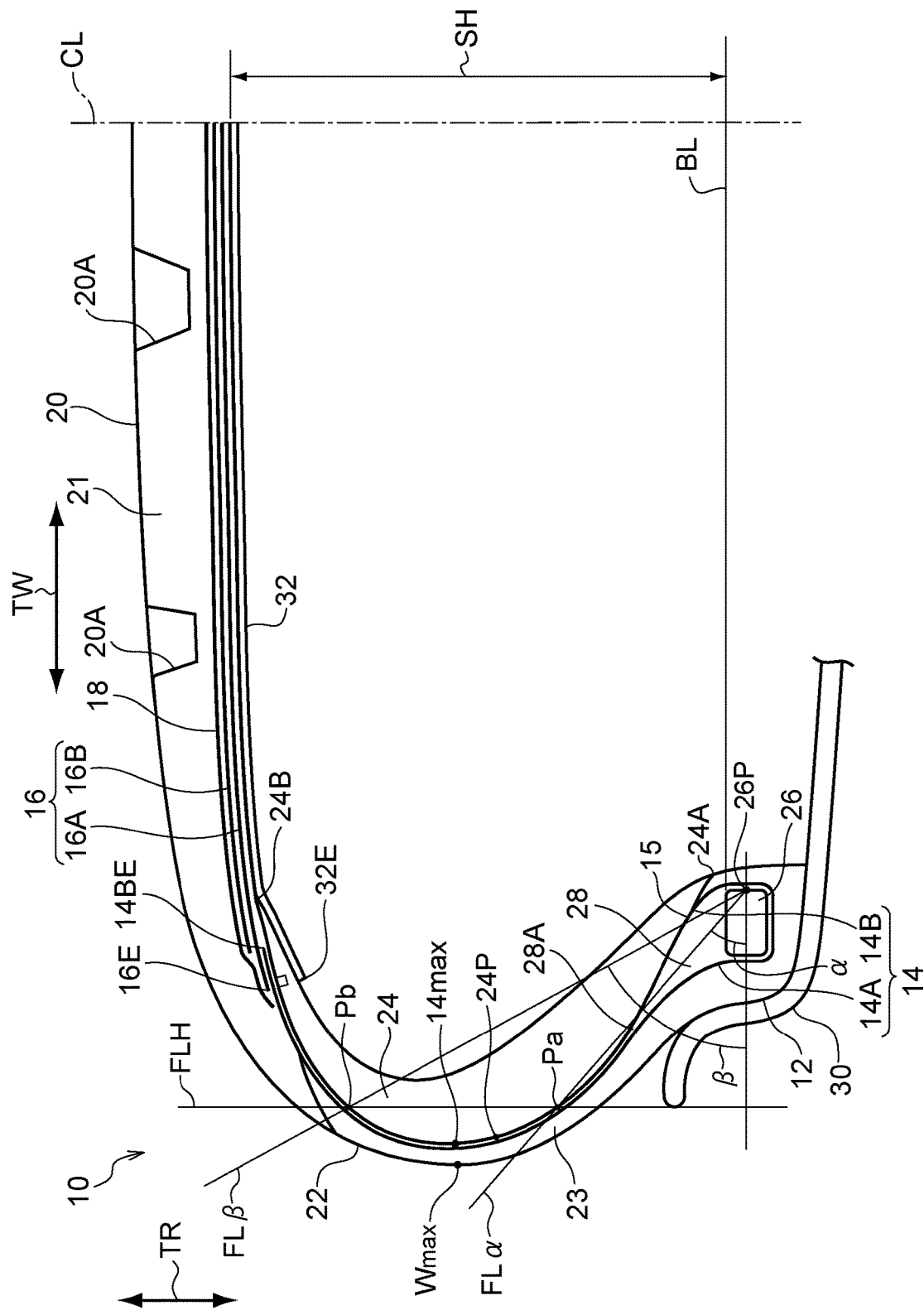
FIG. 2 is a half sectional view showing a half side of a cross-section in which the run-flat tire relating to the embodiment of the present invention is cut along the tire axial direction.

FIG. 1 and FIG. 2 are cross-sectional views along the tire rotation axis of the run-flat tire 10 that is in a state of being mounted to a standard rim 30 and not being filled with internal pressure (having the same air pressure as the outside air).

As shown in FIG. 1, the run-flat tire 10 relating to the present embodiment has a pair of bead portions 12, a carcass 14, a belt 16, a belt reinforcing layer 18, a tread portion 20, tire side portions 22, side reinforcing rubbers 24 that serve as side reinforcing layers, and an inner liner 32.

The bead portions 12 are provided as a left-right pair with an interval therebetween in the tire width direction (In FIG. 1, only the bead portion 12 at one side is illustrated.) Bead cores 26 are respectively embedded in the pair of bead portions 12, and the carcass 14 spans between these bead cores 26.

(Carcass)

The carcass 14 of the present embodiment is structured by one carcass ply 15. The carcass ply 15 is formed by plural cords (not illustrated; e.g., organic fiber cords or metal cords or the like) being covered by a covering rubber. The carcass 14 that is formed in this way extends in a toroidal form from one of the bead cores 26 to the other bead core 26, and structures the frame of the tire. Note that the run-flat tire 10 of the present embodiment is a tire of a radial structure. The cords of the carcass ply 15 extend in the tire radial direction (the radial direction) at the tire side portions, and extend in directions intersecting the tire equatorial plane CL at the tire outer peripheral portion.

Note that, at the carcass 14, the portion spanning from the one bead core 26 to the another bead core 26 is called a main body portion 14A, and the portions, which are folded over around the bead cores 26 from the tire inner side toward the tire outer side, are called the folded-over portions 14B. Note that, in the present embodiment, an end portion 14BE of the folded-over portion 14B is, in the vicinity of a tire width direction outermost end 16E of the belt 16 that is described later, sandwiched between the belt 16 and the main body portion 14A of the carcass 14.

Further, the end portion 14BE of the folded-over portion 14B is preferably disposed further toward the tire width direction outer side than another end portion 24B of the side reinforcing rubber 24 that is described later, and further toward the tire radial direction inner side than the belt end of either belt ply 16A, 16B that are described later.

In the following description, "case line 14CL" indicates the central line of the thickness of the carcass 14. For example, at a portion where there is the single carcass ply 15, the central line of the thickness of the carcass ply 15 is the "case line 14CL", and, at a portion where the plural carcass plies 15 overlap, the central line of the thickness of the plural, overlapping carcass plies 15 is the "case line 14CL". Further, at the portion where the main body portion 14A and the folded-over portion 14B of the carcass 14 exist (the portion where a bead filler 28 that is described later is located), the central line (shown by the two-dot chain line in FIG. 1) of the main body portion 14 and the folded-over portion 14B is the "case line 14CL".

Further, in the present embodiment, at the run-flat tire 10 that is in a state of being mounted to the standard rim 30 and not being filled with internal pressure, a maximum height SH of the case line 14CL, which is measured toward the tire radial direction outer side from a reference line BL that passes through the tire radial direction outer side end of the bead core 26 and is parallel to the tire rotation axis (not shown), is called the side height (see FIG. 1).

Moreover, in the present embodiment, the intersection point between the case line 14CL and imaginary line FL1, which passes through a position that is apart from the reference line BL toward the tire radial direction outer side by 10% of the side height SH and which is parallel along the tire rotation axis, is called 0.1SHp, the intersection point between the case line 14CL and imaginary line FL2, which passes through a position that is apart from the reference line BL toward the tire radial direction outer side by 20% of the side height SH and which is parallel along the tire rotation axis, is called 0.2SHp, the intersection point between the case line 14CL and imaginary line FL4, which passes through a position that is apart from the reference line BL toward the tire radial direction outer side by 40% of the side height SH and which is parallel along the tire rotation axis, is called 0.4SHp, and the intersection point between the case line 14CL and imaginary line FL6, which passes through a position that is apart from the reference line BL toward the tire radial direction outer side by 60% of the side height SH and which is parallel along the tire rotation axis, is called 0.6SHp.

Between the intersection point 0.1SHp and the intersection point 0.2SHp, the case line 14CL of the carcass 14 of the present embodiment is formed in a circular arc shape that has a center of curvature at the tire inner side, and whose average radius of curvature is R1, and that is convex toward the tire outer side. Between the intersection point 0.4SHp and the intersection point 0.6SHp, the case line 14CL of the carcass 14 of the present embodiment is formed in a circular arc shape that has a center of curvature at the tire inner side, and whose average radius of curvature is R2, and that is convex toward the tire outer side. Note that the case line 14CL between the intersection point 0.2SHp and the intersection point 0.4SHp is formed in a circular arc shape that is convex toward the tire outer side and is smoothly connected to the circular arc shape between the intersection point 0.1SHp and the intersection point 0.2SHp, and to the circular arc shape between the intersection point 0.4SHp and the intersection point 0.6SHp.

In the present embodiment, the radius of curvature R1 is set to be larger than the radius of curvature R2, and the ratio R2/R1 is set to be greater than 0.3. Further, it is preferable that the ratio R2/R1 be set to be greater than 0.4. Note that the ratio R2/R2 is preferably set to be smaller than 1.3.

Moreover, it is preferable to set the radius of curvature R1 to within a range of 100 to 200% of the side height SH, and it is preferable to set the radius of curvature R2 to within a range of 50 to 150% of the side height SH.

Here, the radius of curvature R1 and the radius of curvature R2 are both average values. The case line 14CL between the intersection point 0.1SHp and the intersection point 0.2SHp, and the case line 14CL between the intersection point 0.4SHp and the intersection point 0.6SHp, may be circular arc shapes that have a single radius of curvature, or may be circular arc shapes that are formed from plural radii of curvature, or may be substantial circular arc shapes whose radii of curvature vary gradually. Further, the radius of curvature of the case line 14CL between the intersection point 0.4SHp and the intersection point 0.6SHp may, depending on the case, be infinite, or, in other words, the case line 14CL between the intersection point 0.4SHp and the intersection point 0.6SHp may be rectilinear. Both between the intersection point 0.1SHp and the intersection point 0.2SHp, and between the intersection point 0.4SHp and the intersection point 0.6SHp, the case line 14CL of the present embodiment is a circular arc shape having a single radius of curvature.

At the bead portion 12, the bead filler 28 that extends toward the tire radial direction outer side from the bead core 26 is embedded in the region that is sandwiched by the main body portion 14A and the folded-over portion 14B of the carcass 14. Further, the thickness of the bead filler 28 decreases toward an end portion 28A at the tire radial direction outer side. The bead filler 28 is formed of a rubber that is harder than a side rubber 23. Note that the shape and the material of the bead filler 28 are not limited to those of the present embodiment.

Note that, given that the sectional surface area of the bead filler 28 when the run-flat tire 10 is cut along the tire rotation axis is Abf, and that the sectional surface area of the side reinforcing rubber 24 is Arr, ratio Abf/Arr is preferably made to be within the range of 0.04 to 0.17, and more preferably made to be within the range of 0.08 to 0.15, and is even more preferably made to be within the range of 0.09 to 0.13.

Given that the sectional surface area of the side reinforcing rubber 24 which is further toward the tire radial direction inner side than imaginary line FLW is Arri, and the sectional surface area of the side reinforcing rubber 24 which is further toward the tire radial direction outer side than the imaginary line FLW is Arro, ratio Arri/Arro is preferably made to be within the range of 0.3 to 1.5, and is more preferably made to be within the range of 0.3 to 1.0, and is even more preferably made to be within the range of 0.5 to 0.6.

Given that the sectional surface area of the bead core 26 is Ac, ratio Ac/Abf is preferably made to be within the range of 0.7 to 1.1, and is more preferably made to be within the range of 0.8 to 1.8, and is even more preferably made to be within the range of 0.90 to 0.95.

Ratio ta/G of total gauge G and thickness ta is preferably made to be within the range of 0.6 to 1.0, and is more preferably made to be within the range of 0.6 to 0.8, and is even more preferably made to be within the range of 0.7 to 0.8.

The flatness ratio of the run-flat tire 10 is preferably 65% or less, and more preferably 50% or less, and even more preferably 35% or less.

As shown in FIG. 2, given that the intersection point at which imaginary line FLH, which passes through the rim end of the standard rim 30 and is parallel to the tire radial direction, intersects the main body portion 14A of the carcass 14 at the tire radial direction inner side of tire maximum width portion Wmax is Pa, and that the angle formed by imaginary line FLα, which connects this intersection point Pa and tire width direction inner side end 26P of the bead core 26, with respect to the tire width direction is α, it is preferable that $30°<\alpha<70°$, and it is more preferable that $35°<\alpha<60°$, and it is even more preferable that $35'<\alpha<45°$.

Note that, in a case in which the cross-sectional shape of the bead core 26 is rectangular as in the present embodiment, the tire width direction inner side end 26P of the bead core 26 is the central point in the length direction of the tire width direction inner side of the bead core 26.

Given that the intersection point at which the above-described imaginary line FLH intersects the main body portion 14A of the carcass 14 at the tire radial direction outer side of the tire maximum width portion Wmax is Pb, and that the angle formed by imaginary line FLβ, which connects this intersection point Pb and the tire width direction inner side end 26P of the bead core 26, with respect to the tire width direction is β, it is preferable that $50°<\beta<80°$, and it is more preferable that $55°<\beta<70°$, and it is even more preferable that $55°<\beta<65°$.

As shown in FIG. 1, it is preferable that the another end portion 24B side at the tire radial direction outer side of the side reinforcing rubber 24 is disposed further toward the tire width direction inner side than the belt end of the first belt ply 16A and the belt end of the second belt ply 16B.

It is preferable that vertex 34T of a rim guard 34 is disposed further toward the tire width direction outer side than tire width direction outer end 14max of the main body portion 14A of the carcass 14.

(Belt)

The belt 16 is disposed at the tire radial direction outer side of the carcass 14. The belt 16 of the present embodiment is structured by one or plural belt plies. As an example, the belt 16 of the present embodiment is structured to include the first belt ply 16A that is at the tire radial direction inner side, and the second belt ply 16B that is disposed at the tire radial direction outer side of the first belt ply 16A and has a narrower width than the first belt ply 16A.

The belt plies 16A, 16B are formed by plural cords (steel cords in the present embodiment), which are lined-up parallel to one another, being covered by a covering rubber. The cords that structure the belt plies 16A, 16B are disposed at an incline with respect to the tire peripheral direction (as an example, are inclined at inclination angles of 15° to 30° with respect to the tire peripheral direction). Note that the cords of the belt ply 16A and the cords of the belt ply 16B are inclined in directions opposite to one another with respect to the tire equatorial plane CL. Namely, the belt 16 of the present embodiment is a so-called crossing belt.

The belt reinforcing layer 18 is disposed at the tire radial direction outer side of the belt 16. As an example, the belt reinforcing layer 18 is structured to include cords that extend in the tire peripheral direction, and is disposed so as to cover the entire belt 16.

A tread rubber 21 that structures the tread portion 20 is disposed at the tire radial direction outer side of the belt 16 and the belt reinforcing layer 18. The tread portion 20 is the region that contacts the road surface during traveling. Peripheral direction grooves 20A that extend in the tire peripheral direction are formed in the surface of the tread portion 20. Further, unillustrated width direction grooves that extend in the tire width direction are formed in the tread portion 20. Note that the shapes of and the numbers of the peripheral direction grooves 20A and the width direction grooves are set appropriately in accordance with the performances required of the run-flat tire 10, such as drainability, handling stability, and the like.

The tire side portion 22 is provided between the bead portion 12 and the tread portion 20. The tire side portion 22 extends in the tire radial direction and connects the bead portion 12 and the tread portion 20. The side rubber 23 is disposed at the tire side portion 22 and the bead portion 12, at the tire width direction outer side of the carcass 14.

(Side Reinforcing Rubber)

The tire side portion 22 is structured as described hereinafter, so as to be able to bear the load that is applied to the run-flat tire 10 at the time of run-flat traveling.

The side reinforcing rubber 24, which is formed from a single rubber material and reinforces the tire side portion 22, is disposed at the tire side portion 22 at the tire width direction inner side of the carcass 14. The side reinforcing rubber 24 is a reinforcing rubber for, in a case in which the internal pressure of the run-flat tire 10 decreases due to a puncture or the like, having the vehicle travel a predetermined distance in a state of supporting the weight of the vehicle and the vehicle occupants. Note that, in the present embodiment, as an example, the side reinforcing rubber 24 whose main component is rubber is provided, but the present invention is not limited to this, and the side reinforcing rubber 24 may be formed of another material, e.g., may be formed with the main component thereof being a thermoplastic resin or the like.

In the present embodiment, the side reinforcing rubber 24 is formed of a single type of rubber member, but the present invention is not limited to this, and the side reinforcing rubber 24 may be formed, for example, of plural rubber members having different hardnesses. Further, provided that a rubber member is the main component thereof, the side reinforcing rubber 24 may include, in addition thereto, materials such as fillers, short fibers, resin, or the like. Moreover, in order to improve the durability at the time of run-flat traveling, a rubber member of a JIS hardness of 70 to 80 as measured at 20° C. by using a durometer hardness tester, may be contained as the rubber member that structures the side reinforcing rubber 24. Moreover, the side reinforcing rubber 24 may contain a rubber member whose loss factor tan δ, which is measured under the conditions of a frequency of 20 Hz, an initial strain of 10%, a dynamic strain of ±2%, and a temperature of 60° C. by using a viscoelasticity spectrometer (e.g., the spectrometer manufactured by Toyo Seiki Seisakusho), is 0.10 or less.

The side reinforcing rubber 24 extends in the tire radial direction along the inner surface of the main body portion 14A of the carcass 14, and is formed in a shape whose thickness t decreases toward the bead core 26 side and the tread portion 20 side, e.g., a substantial crescent shape in cross-section. Note that what is called the thickness t here means the length measured orthogonally from the tire inner surface of the side reinforcing rubber 24, in the state in which the run-flat tire 10 is mounted to the standard rim 30 and the internal pressure is zero.

One end portion 24A side at the tire radial direction inner side of the side reinforcing rubber 24 overlaps the bead filler 28 with the carcass 14 sandwiched therebetween. Namely, the one end portion 24A side of the side reinforcing rubber 24 is disposed so as to overlap the bead filler 28 in the tire radial direction.

On the other hand, the another end portion 24B side at the tire radial direction outer side of the side reinforcing rubber 24 overlaps the belt 16 with the carcass 14 sandwiched therebetween. Namely, the another end portion 24B side of the side reinforcing rubber 24 is disposed so as to overlap the belt 16 in the tire width direction.

Moreover, given that the total gauge from the tire inner surface to the tire outer surface when measured on the imaginary line FLW, which passes through the tire maximum width portion Wmax of the run-flat tire 10 and is parallel to the tire rotation axis, is G, and that the distance from the tire inner surface to the case line 14CL when measured in a direction orthogonal to the tire inner surface is t, it is preferable that, between the imaginary line FL1 and the imaginary line FL6, the distance t is set to be within a range of 50 to 90% of the total gauge G.

Further, side reinforcing rubber maximum width portion position 24P, at which the side reinforcing rubber 24 becomes the maximum width (tmax) is preferably within a range of 20 to 60% of the side height SH, and is more preferably within a range of 30 to 50% of the side height SH, and is even more preferably within a range of 30 to 40% of the side height SH.

(Inner Liner)

In the present embodiment, the inner liner 32 is disposed at the carcass 14 at the tire radial direction inner side of the tread portion 20, and at the inner surface of the side reinforcing rubber 24. As an example, the inner liner 32 is structured of a rubber whose main component is butyl rubber. A rubber that is more difficult for gas to permeate therethrough than, and whose loss (loss factor tan δ) is greater than, the other rubbers (e.g., the tread rubber 21, the side rubber 23, and the like) that structure the run-flat tire 10, is used as the rubber that structures the inner liner 32.

A tire width direction end 32E of the inner liner 32 is disposed so as to not extend further toward the tire width direction outer side than the imaginary line FLE that is orthogonal to the tire inner surface (in the present embodiment, the inner surface of the side reinforcing rubber 24) and that passes through the tire width direction outermost end 16E of the belt 16 (the width direction end portion of the first belt ply 16A). In other words, the inner liner 32 is not disposed at the tire inner surface side of the tire side portion 22 and the bead portion 12. In the present embodiment, the tire width direction end 32E of the inner liner 32 is positioned on the imaginary line FLE.

Here, distance (shortest distance) Lmin from the tire width direction end 32E of the inner liner 32 to the case line 14CL of the carcass 14 is preferably set to be 1 mm or more.

(Operation, Effects)

Operation of the run-flat tire 10 of the present embodiment is described next.

At the run-flat tire 10 of the present embodiment, the inner liner 32 is disposed, at the tire inner surface side of the carcass 14 that is positioned at the tire radial direction outer side, and not further toward the tire width direction outer side than the imaginary line FLE that passes through the tire width direction outermost end 16E of the belt 16 and extends orthogonally to the tire inner surface. In other words, at the run-flat tire 10 of the present embodiment, because the inner liner 32 is not provided at the tire side portion 22, the rolling resistance can be decreased and the fuel efficiency can be improved, as compared with a run-flat tire in which an inner liner is provided at the entire tire inner surface.

Moreover, due to the tire width direction end 32E of the inner liner 32 being disposed on the imaginary line FLE as in the present embodiment, permeating of gas (the air filled within the tire) to the tire outer side can be suppressed to the maximum degree, without the rolling resistance being made to deteriorate. Note that, at further toward the tire width direction outer side than the imaginary line FLE, the side reinforcing rubber 24 that is thick is provided, and therefore, permeating of gas to the tire outer side can be suppressed.

Further, at the run-flat tire 10 of the present embodiment, given that the case line 14CL between the intersection point 0.1SHp and the intersection point 0.2SHp is shaped as a circular arc that is convex toward the tire outer side, and the average radius of curvature thereof is radius R1, and that the case line 14CL between the intersection point 0.4SHp and the intersection point 0.6SHp when viewed in a cross-section along the tire rotation axis is shaped as a circular arc that is convex toward the tire outer side, and the average radius of curvature thereof is radius R2, the ratio R2/R1 is set to be greater than 0.3. Therefore, the vertical spring constant at the time of usual traveling can be lowered, and excessive collapsing-in of the bead portions 12 and the tire side portions 22 at the time of run-flat traveling can be suppressed, and both riding comfort and run-flat durability can be achieved. Note that, because the run-flat durability improves, it is even more preferable to set the ratio R2/R1 to be greater than 0.4.

However, it is preferable to set the ratio R2/R1 to be less than 1.3. If the ratio R2/R1 is too large, the flexure of the tire side portions at the time of run-flat traveling is too large, and satisfactory run-flat durability cannot be obtained.

Further, in the run-flat tire 10 of the present embodiment, distance Lmin from the tire width direction end 32E of the inner liner 32 to the main body portion 14A of the carcass 14 is set to be 1 mm or more. Therefore, the distance from the tire width direction end 32E of the inner liner 32 to the cords of the belt 16 can be made to be long, and the thickness of the side reinforcing rubber 24 can be ensured, such that the cords of the belt 16 (e.g., steel cords) are not affected and deteriorated by the oxygen that is included in the air within the tire (such that rust does not form and the like).

Further, in the run-flat tire 10 of the present embodiment, at the case line 14CL at the tire lateral side, the radius R2 of the case line 14CL at the tire radial direction outer side is set to be within a range of 100 to 200% of the side height SH, and the radius R1 of the case line 14CL at the tire radial direction inner side is set to be within a range of 50 to 150% of the side height SH. Due thereto, the run-flat durability at the time of run-flat traveling can be ensured, while the vertical spring constant at the time of usual traveling of the run-flat tire 10 is reduced.

If the radius R1 is less than 100% of the side height SH, the rigidity in the vicinity of the bead is low, and due to the collapsing-in deformation at the rim side increasing, the deformation concentrates at that place, and therefore, the run-flat durability performance in particular suffers.

If the radius R1 exceeds 200% of the side height SH, the rigidity in the vicinity of the bead is high, and the riding comfort at the time of usual internal pressure is adversely affected.

If the radius R2 is less than 50% of the side height SH, the rigidity in the vicinity of the maximum width is low, and this region can flex pliantly. However, at the time of run-flat traveling, the deformation that concentrates at the side reinforcing layer is large, and the run-flat durability performance in particular suffers.

If the radius R2 exceeds 150% of the side height SH, the rigidity in the vicinity of the maximum width is high, and this region cannot flex pliantly. Therefore, the riding comfort at the time of usual internal pressure is adversely affected.

By the way, if the tire side portion 22, which is substantially circular arc shaped and projects-out toward the tire width direction outer side, collapses due to a decrease in internal pressure, at the portion that is further toward the tire outer side than the neutral axis of the tire side portion 22, tensile force is applied in the tire radial direction, and this portion extendingly deforms (extends) in the tire radial direction, and, at the portion that is further toward the tire inner side than the neutral axis of the tire side portion 22, compressive force is applied in the tire radial direction, and this portion is compressed in the tire radial direction. Further, the further away from the neutral axis, the greater the amount of deformation.

In the run-flat tire 10 of the present embodiment, between the imaginary line FL1 and the imaginary line FL6, t/G is set to be within the range of 0.5 to 0.8. Therefore, the position of the carcass ply 15 that is embedded in the tire side portion 22 is disposed so as to be apart, toward the tire width direction outer side, from the neutral axis at the tire side portion 22. In other words, the carcass ply 15, which includes the cords that are difficult to stretch as compared with rubber, is disposed at the region where the amount of deformation is large at the time of decreased internal pressure. Therefore, even without making the side reinforcing rubber 24, which deteriorates the riding comfort at the time of usual traveling, thick, the deformation (collapsing) of the tire side portion 22 at the time of reduced internal pressure is suppressed due to the tensile force being borne by the cords of the carcass ply 15, and the run-flat durability can be ensured.

Other Embodiments

Although an embodiment of the present invention has been described above, the present invention is not limited to the above, and, other than the above, can of course be implemented by being modified in various ways within a scope that does not depart from the gist thereof.

The carcass 14 of the above-described embodiment is structured by the single carcass ply 15. However, the present invention is not limited to this, and the carcass 14 may be structured by plural carcass plies 15.

The belt 16 of the above-described embodiment is a so-called crossing belt that is structured by two belt plies, but may be a spiral belt. Further, the belt 16 may be a structure in which cords are embedded within a resin layer.

Although the inner liner 32 of the above-described embodiment is, as an example, formed of a rubber whose main component is butyl rubber, the present invention is not limited to this. The inner liner 32 may be a liner whose main component is another rubber member or a resin, or may be a resin film.

In the run-flat tire 10 of the above-described embodiment, a projection-shaped rim guard (a rim protector) for suppressing excessive deformation of the bead portion 12 (collapsing toward the tire width direction outer side) is not provided at the outer side surface of the bead portion 12. However, the present invention is not limited to this, and a rim guard may be provided at the outer side surface of the bead portion 12.

Although the above-described embodiment describes a run-flat tire for a passenger vehicle, the present invention can also be applied to a run-flat tire that is used in a vehicle other than a passenger vehicle.

The disclosure of Japanese Patent Application No. 2018-120306 filed on Jun. 25, 2018 is, in its entirety, incorporated by reference.

All publications, patent applications, and technical standards mentioned in the present specification are incorporated by reference into the present specification to the same extent as if such individual publication, patent application, or technical standard was specifically and individually indicated to be incorporated by reference.

The invention claimed is:

1. A run-flat tire comprising:
a pair of bead cores;
a carcass that has a main body portion that spans between the pair of bead cores, and folded-over portions that are folded-over around the bead cores;
a belt that is provided at a tire radial direction outer side of the carcass;
side reinforcing layers that are provided at a tire width direction inner side of the carcass, and whose thicknesses gradually decrease toward tire radial direction both sides; and
an inner liner that is provided at a tire inner surface side of the carcass, which is positioned at a tire radial direction outer side, and at a position further toward a tire width direction inner side than an imaginary line passing through a tire width direction outermost end of the belt and extending orthogonally to a tire inner surface,
wherein, given that:
a central line of the carcass is a case line;
a height dimension of the case line measured in a tire radial direction from a reference line, which passes through a tire radial direction outer side end of the bead core and is parallel to a tire rotation axis, when viewed in a cross-section along the tire rotation axis in a state in which the run-flat tire is mounted to a standard rim and is at zero internal pressure, is side height SH;
an intersection point of the case line and an imaginary line, which passes through a position that is apart from the reference line toward a tire radial direction outer side by 10% of the side height SH and which is parallel along the tire rotation axis, is 0.1SHp;
an intersection point of the case line and an imaginary line, which passes through a position that is apart from the reference line toward the tire radial direction outer side by 20% of the side height SH and which is parallel along the tire rotation axis, is 0.2SHp;
an intersection point of the case line and an imaginary line, which passes through a position that is apart from the reference line toward the tire radial direction outer side by 40% of the side height SH and which is parallel along the tire rotation axis, is 0.4SHp;
an intersection point of the case line and an imaginary line, which passes through a position that is apart from the reference line toward the tire radial direction outer side by 60% of the side height SH and which is parallel along the tire rotation axis, is 0.6SHp;
an average radius of curvature of the case line between the intersection points 0.1SHp and 0.2SHp when viewed in the cross-section along the tire rotation axis is radius R1; and
an average radius of curvature of the case line between the intersection points 0.4SHp and 0.6SHp when viewed in the cross-section along the tire rotation axis is radius R2,
ratio R2/R1 is set to be greater than 0.3.

2. The run-flat tire of claim 1, wherein, when viewed in the cross-section along the tire rotation axis, a tire width direction end of the inner liner is positioned on the imaginary line passing through the tire width direction outermost end of the belt and extending orthogonally to the tire inner surface.

3. The run-flat tire of claim 1, wherein
the radius R1 is within a range of 100 to 200% of the side height SH, and
the radius R2 is within a range of 50 to 150% of the side height SH.

4. The run-flat tire of claim 1, wherein, given that:
a tire total gauge that is measured on an imaginary line that passes through a tire maximum width portion and that is parallel to the tire rotation axis is G, and
between an imaginary line passing through the intersection point 0.1SHp and extending orthogonally to a tire inner surface, and an imaginary line passing through the intersection point 0.6SHp and extending orthogonally to the tire inner surface, a distance from the tire inner surface to the case line that is measured along a direction orthogonal to the tire inner surface is t,
t/G is set to be within a range of 0.5 to 0.8.

* * * * *